(12) United States Patent
Feng et al.

(10) Patent No.: US 11,868,554 B2
(45) Date of Patent: Jan. 9, 2024

(54) PRESSURE SENSOR

(71) Applicant: Peratech Holdco Limited, North Yorkshire (GB)

(72) Inventors: Xu Feng, Jiansu (CN); Cao Jin, Jiansu (CN); Sun Kun, Jiansu (CN); Wei Xin, Jiansu (CN)

(73) Assignee: Peratech Holdco Limited, North Yorkshire (GB)

( * ) Notice: Subject to any disclaimer, the term of this patent is extended or adjusted under 35 U.S.C. 154(b) by 0 days.

(21) Appl. No.: 17/802,259

(22) PCT Filed: Feb. 24, 2021

(86) PCT No.: PCT/GB2021/000020
§ 371 (c)(1),
(2) Date: Aug. 25, 2022

(87) PCT Pub. No.: WO2021/170967
PCT Pub. Date: Sep. 2, 2021

(65) Prior Publication Data
US 2023/0077382 A1    Mar. 16, 2023

(30) Foreign Application Priority Data

Feb. 25, 2020   (CN) .......................... 202020211296.2

(51) Int. Cl.
*G06F 3/041* (2006.01)
*G06F 3/044* (2006.01)
(Continued)

(52) U.S. Cl.
CPC ........ *G06F 3/04144* (2019.05); *G01L 1/2287* (2013.01); *G06F 3/044* (2013.01);
(Continued)

(58) Field of Classification Search
CPC .. G06F 3/04144; G06F 3/0445; G06F 3/0447; G06F 3/045; G06F 2203/04105; G06F 3/044; G01L 1/2287; G01L 1/14
See application file for complete search history.

(56) References Cited

U.S. PATENT DOCUMENTS

| | | | |
|---|---|---|---|
| 2002/0094660 A1* | 7/2002 | Getz ...................... | G06F 3/045 438/455 |
| 2003/0112227 A1* | 6/2003 | Hong ..................... | G06F 3/045 345/173 |

(Continued)

FOREIGN PATENT DOCUMENTS

| | | |
|---|---|---|
| CN | 106681564 A | 5/2017 |
| CN | 108534921 A | 9/2018 |

(Continued)

OTHER PUBLICATIONS

International Search Report and Written Opinion cited in PCT/GB2021/000020, dated May 19, 2021, 9 pages.

*Primary Examiner* — Patrick N Edouard
*Assistant Examiner* — Joseph P Fox
(74) *Attorney, Agent, or Firm* — Cooper Legal Group, LLC

(57) ABSTRACT

A pressure sensor comprises a first sensing module comprising a first negative electrode and first support structures arranged at intervals on the first negative electrode. A first flexible insulating layer covers an upper surface of the first support structures and first positive electrodes are arranged at intervals on a lower surface of the first flexible insulating layer and distributed between the first support structures. A second sensing module comprises a second negative electrode disposed on the first flexible insulating layer and second support structures are arranged at intervals on the second negative electrode. A second flexible insulating layer covers an upper surface of the second support structures.

(Continued)

Second positive electrodes are arranged on a lower surface of the second flexible insulating layer at intervals and distributed between the second support structures. The first support structures are offset from the second support structures.

16 Claims, 4 Drawing Sheets

(51) Int. Cl.
    *G06F 3/045*     (2006.01)
    *G01L 1/22*     (2006.01)

(52) U.S. Cl.
    CPC ............ *G06F 3/045* (2013.01); *G06F 3/0445* (2019.05); *G06F 3/0447* (2019.05); *G06F 2203/04105* (2013.01)

(56) References Cited

U.S. PATENT DOCUMENTS

| | | | | |
|---|---|---|---|---|
| 2016/0147333 | A1* | 5/2016 | Levesque | H04M 1/0268 345/161 |
| 2017/0075467 | A1* | 3/2017 | Kim | G01L 1/148 |
| 2018/0253180 | A1* | 9/2018 | Bie | G06F 3/0446 |

FOREIGN PATENT DOCUMENTS

| | | |
|---|---|---|
| DE | 102016120849 A1 | 5/2018 |
| WO | 2019160348 A1 | 8/2019 |

* cited by examiner

PRESSURE SENSOR

CROSS REFERENCE TO RELATED APPLICATIONS

This application claims priority from Chinese Utility Model number ZL2020 20211296.2, filed on 25 Feb. 2020, the whole contents of which are incorporated herein by reference.

BACKGROUND OF THE INVENTION

The present invention relates to a pressure sensor and a touch screen comprising a pressure sensor.

Touch panels having integrated force sensors based on electrical contact resistance or capacitance change are known in the art and becoming increasingly more widely used. Such touch panels and their respective sensors are also more frequently designed to have larger touch areas.

However, unlike single-point pressure sensors, pressure sensors with large sensing areas require supports around the touch area to ensure that the initial position of the film layer in the sensor remains consistent. However, if a user touches the area of the support, the conductive positive electrode in the pressure sensor is not subjected to input pressure and a 'blind spot' occurs. Thus, pressure sensing across the whole area cannot be achieved.

There remains a need to provide a pressure sensor and corresponding touch screen to address this problem.

BRIEF SUMMARY OF THE INVENTION

According to a first aspect of the present invention, there is provided a pressure sensor, comprising: a first sensing module and a second sensing module located on said first sensing module; said first sensing module comprising, a first negative electrode; a plurality of first support structures arranged at intervals on said first negative electrode; a first flexible insulating layer arranged to cover an upper surface of each said plurality of first support structures; and a plurality of first positive electrodes, each said first positive electrode being arranged at intervals on a lower surface of said first flexible insulating layer and distributed between said plurality of first support structures; said second sensing module comprising, a second negative electrode disposed on said first flexible insulating layer; a plurality of second support structures arranged at intervals on said second negative electrode; a second flexible insulating layer arranged to cover an upper surface of each said plurality of second support structures; a plurality of second positive electrodes arranged on a lower surface of said second flexible insulating layer at intervals and distributed between said plurality of second support structures; wherein said plurality of first support structures are offset from said plurality of second support structures.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
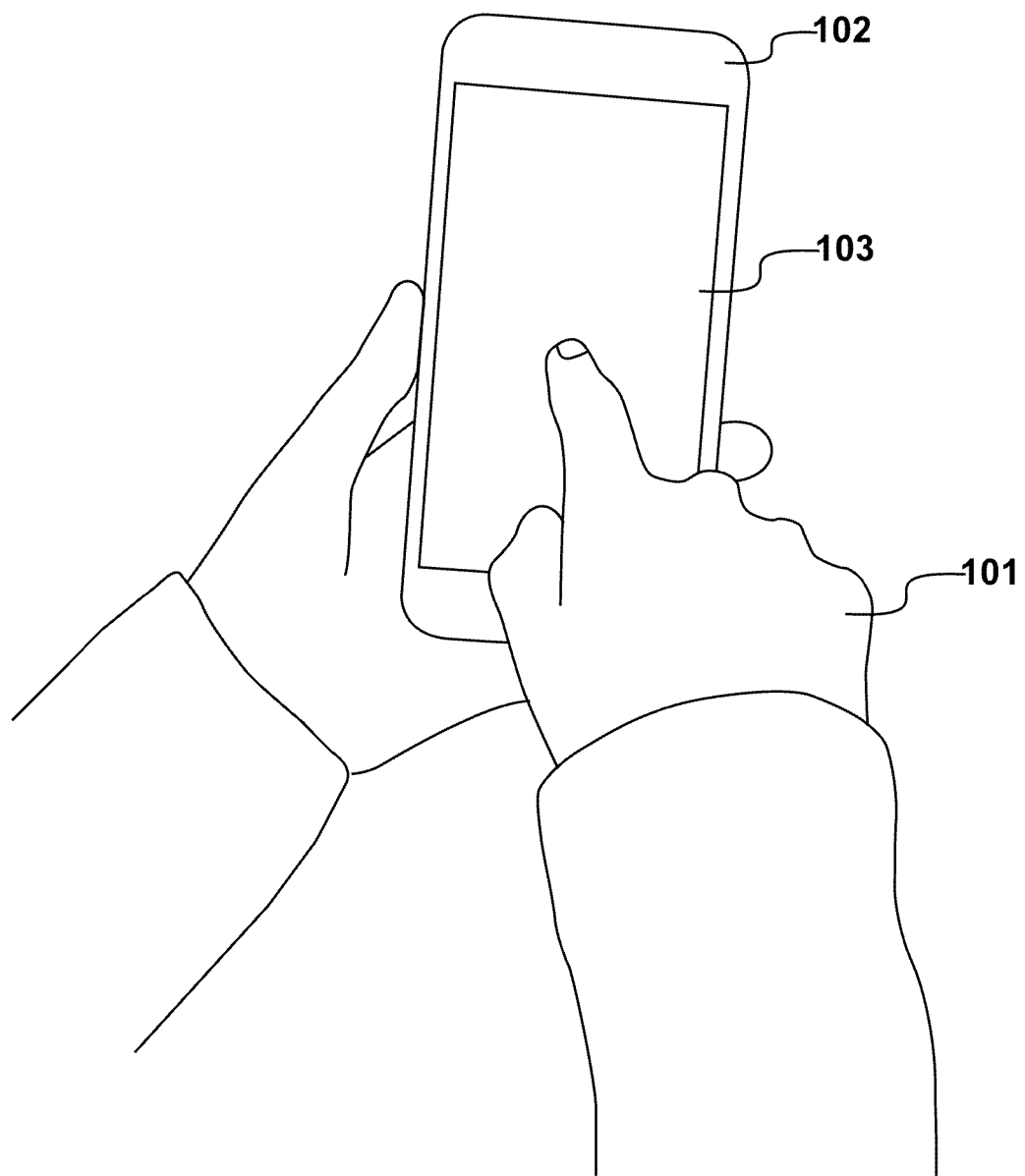
FIG. 1 shows an electronic device having an integrated touch screen comprising a pressure sensor.

A pressure sensor in accordance with the present invention may be integrated into an electronic device such as a mobile telephone in the manner of FIG. 1.

In the embodiment of FIG. 1, a user 101 is shown utilizing electronic device 102 in which electronic device 102 is a mobile telephone.

In the embodiment, mobile telephone 102 comprises a touch screen 103. User 101 can therefore utilize mobile telephone 102 in a conventional manner by applying a pressure by means of their finger to operate mobile telephone 102 via touch screen 103.

In accordance with the present invention, touch screen 103 comprises a pressure sensor which comprises any one of the features of the pressure sensor 201 which will be described in respect of FIGS. 2 to 4.

FIG. 2

As will now be described with respect to FIGS. 2 and 3, an embodiment of the present invention provides a pressure sensor 201, which may be integrated into touch screen 103 as described in FIG. 1.

Figure 2:
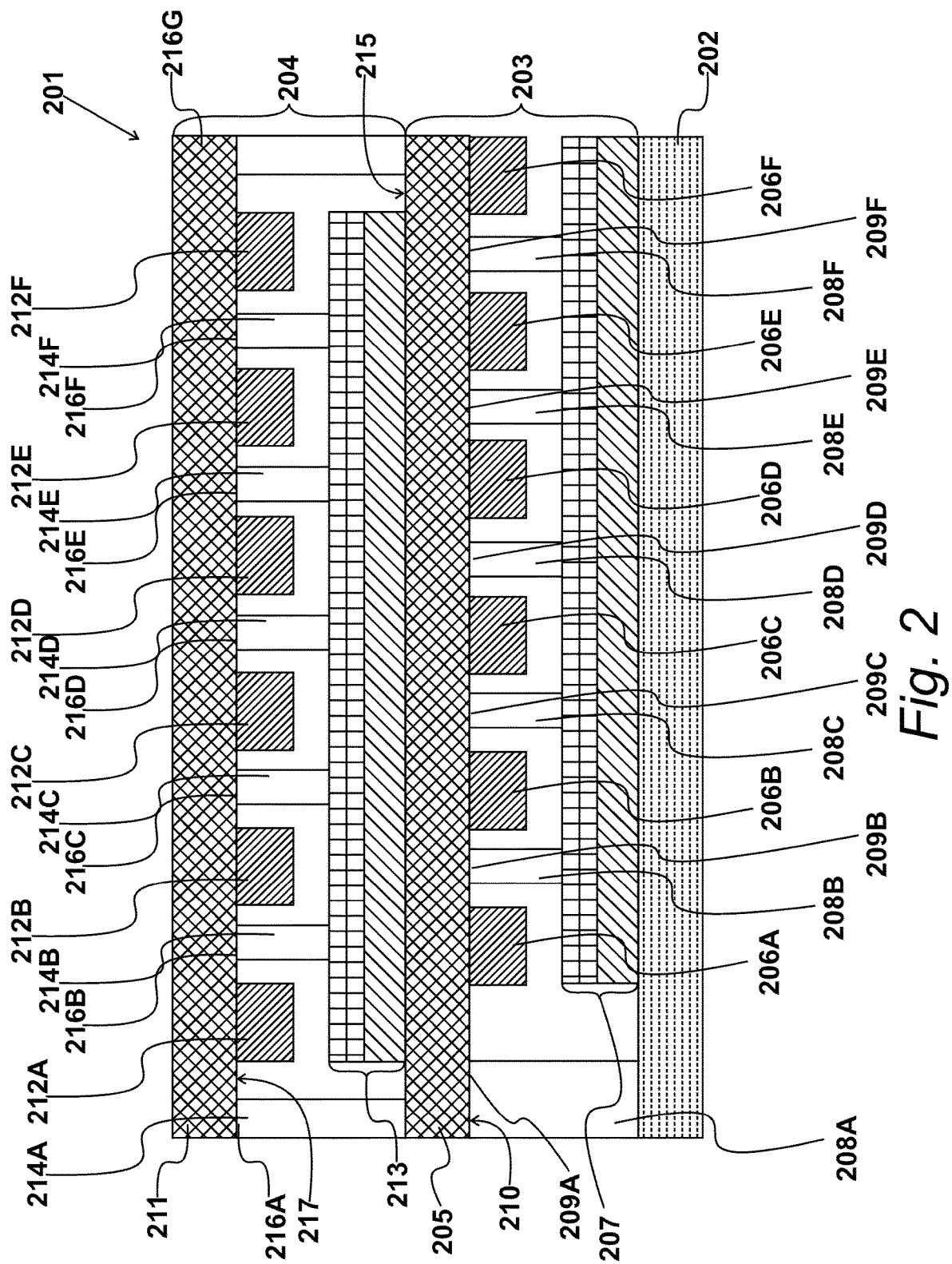
FIG. 2 shows a schematic cross-sectional diagram of a pressure sensor provided by an embodiment of the present invention.

In FIG. 2, pressure sensor 201 comprises a substrate 202, a first sensing module 203 and a second sensing module 204. In the embodiment, first sensing module 203 comprises a first flexible insulating layer 205, a plurality of first positive electrodes 206, a first negative electrode 207, and a plurality of first support structures 208.

In the embodiment, first negative electrode 207 is disposed on substrate 202, and a plurality of the first support structures 208B, 208C, 208D, 208E, 208F are arranged at intervals on first negative electrode 207. First flexible insulating layer 205 is arranged to cover an upper surface 209 of the plurality of first support structures 208. The plurality of first positive electrodes 206 are arranged on a lower surface 210 of first flexible insulating layer 205 at intervals with each of the plurality of positive electrodes 206 being distributed between a corresponding one of the plurality of first support structures 208.

Pressure sensor 201 further comprises a second sensing module 204. Second sensing module 204 comprises a second flexible insulating layer 211, a plurality of second positive electrodes 212, a second negative electrode 213, and a plurality of second support structures 214.

Second negative electrode 213 is disposed on first flexible insulating layer 205 on the upper surface 215 of first flexible insulating layer 205. A plurality of the second support structures 214B, 214C, 214D, 214E, 214F are arranged at intervals on the second negative electrode 213, and second flexible insulating layer 211 covers an upper surface 216 of the plurality of second support structures 214. The plurality of second positive electrodes 212 are spaced apart at intervals and disposed on a lower surface 217 of second flexible insulating layer 211. The second positive electrodes 212 are further distributed among the plurality of second support structures 214.

The plurality of first support structures 208B, 208C, 208D, 208E, 208F and the plurality of second support structures 214B, 214C, 214D, 214E, 214F are staggered or offset from each other, that is, each second support structure 214B, 214C, 214D, 214E, 214F corresponds to, and is aligned with, one of the first positive electrodes 206. For example, second support structure 214C is aligned with first positive electrode 206B. In addition, second positive electrodes 212B, 212C, 212D, 212E, 212F corresponds to, and is aligned with a corresponding first support structure 208B, 208C, 208D, 208E, 208F. For example, second positive electrode 212B is aligned with first support structure 208B.

Figure 3:
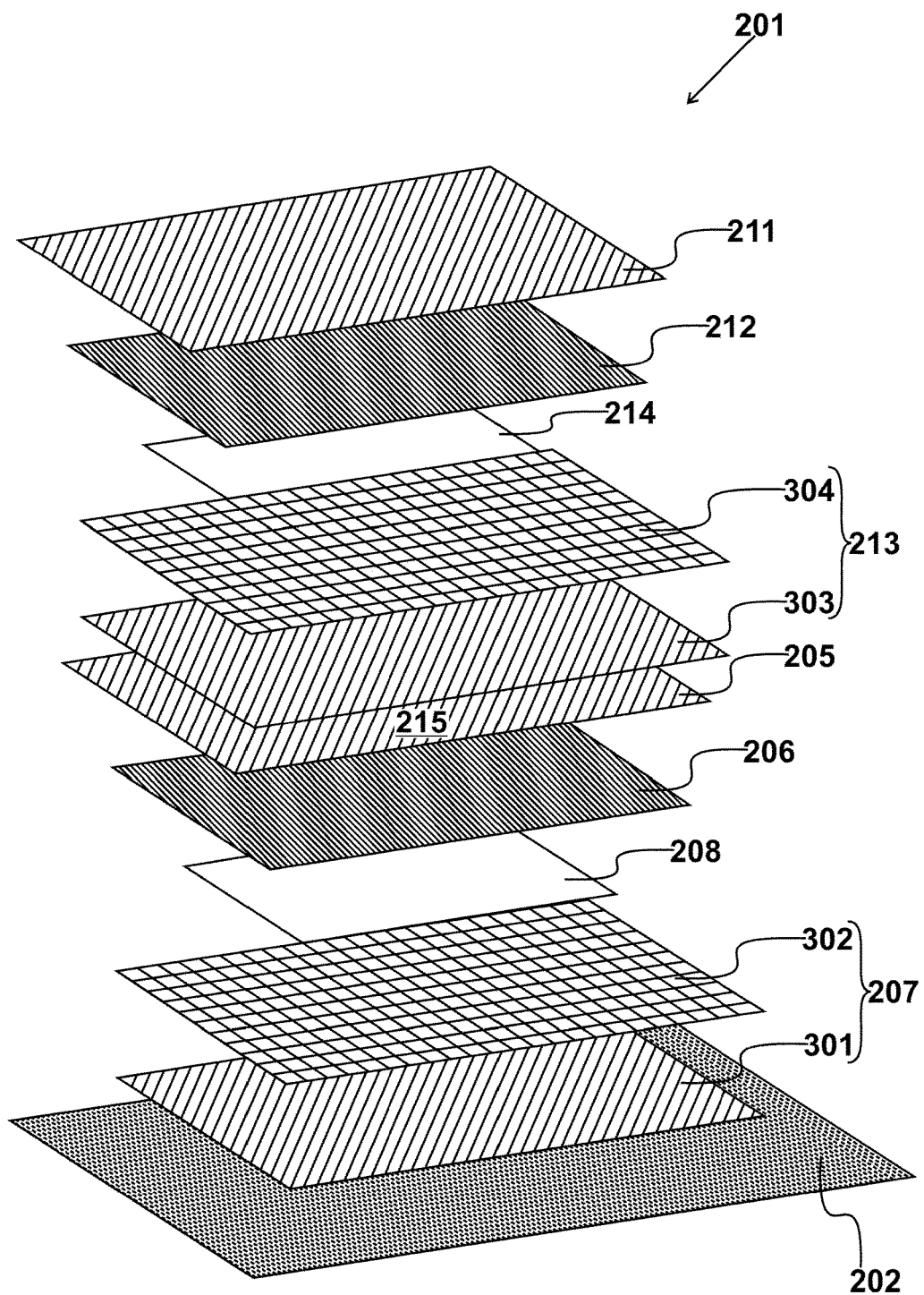
FIG. 3 shows an exploded schematic diagram of the pressure sensor of FIG. 2.

In the embodiment of FIGS. 2 and 3, the number of the plurality of first positive electrodes 206, the number of the plurality of first support structures 208, the number of plurality of second positive electrodes 212, and the number of the plurality of second support structures 214 are multiple and substantially identical.

In an embodiment, first support structures 208B, 208C, 208D, 208E, 208F and second positive electrodes 212B, 212C, 212D, 212E, 212F are arranged directly opposite one another, and second support structures 214B, 214C, 214D, 214E, 214F and first positive electrodes 206A, 206B, 206C, 206D, 206E are arranged directly opposite one by one. In this arrangement, each previous non-sensing area becomes a sensing area.

In the embodiment, each first positive electrode 206 is provided in a gap between every two first support structures 208. Similarly, each second positive electrode 212 is provided in a gap between every two second support structures 214. In one embodiment, the width of each first positive electrode 206 is smaller than the gap distance between the two first support structures 208. Similarly, the width of each second positive electrode 212 is smaller than the gap distance between the two second support structures 214.

In the embodiment, first support structures and second support structures comprise an adhesive material or glue. In an alternative embodiment, any one of the first support structures or second support structures comprise an alternative gasket material.

FIG. 3

Pressure sensor 201 is shown further in schematic exploded view in FIG. 3. It is appreciated that the description in FIGS. 2 and 3 of pressure sensor 201 relates to the same pressure sensor, and all numerals utilized relate to the same features and components.

In the embodiment, as shown both in FIG. 2 and FIG. 3, first negative electrode 207 comprises a first negative electrode metallic layer 301 and a first elastic conductive layer 302. First negative electrode metallic layer 301 is disposed on substrate 202. First elastic conductive layer 302 is disposed on top of first negative electrode metallic layer 301, with the plurality of first support structures 208 being arranged on first elastic conductive layer 302 at intervals as previously described.

Similarly, second negative electrode 213 comprises a second negative electrode metallic layer 303 and a second elastic conductive layer 304. Second negative electrode metallic layer 303 is disposed on upper surface 215 of first flexible insulating layer 205 and second elastic conductive layer 304 is disposed on second negative electrode metallic layer 303. The plurality of second support structures 214 are arranged at intervals on second elastic conductive layer 304.

In an embodiment, the plurality of first support structures 208 and the plurality of second support structures 215 are colloids.

In an embodiment, first elastic conductive layer 302 and second elastic conductive layer 304 are compressible conductors. In this particular embodiment, first elastic conductive layer 302 and first negative electrode metallic layer 301 are separated by a given distance. In addition, second elastic conductive layer 304 is separated from second negative electrode metallic layer 303 by a given distance, such that first elastic conductive layer 302 and second elastic conductive layer 304 are under force. In this way, when a force is applied, first negative electrode metallic layer 301 and second negative electrode metallic layer 303 are brought together.

In an embodiment where first elastic conductive layer 302 and second elastic conductive layer 304 are incompressible electrical conductors, each elastic conductive layer 302, 304 can directly contact its corresponding negative electrode metallic layer.

In an embodiment, each elastic conductive layer 302, 304 comprises a compressible elastic conductive body, which, as an applied force increases, the contact area increases, thereby reflecting a change in the applied force.

In a specific embodiment, the materials of the plurality of first positive electrodes 206, first negative electrode metallic layer 301, the plurality of second positive electrodes 212, and second negative electrode metallic layer 303 each comprise silver.

FIG. 4

In prior known applications, existing pressure sensors with large touch areas effectively have a non-sensing area because when a user touches the support structure in the pressure sensor in an existing single-layer sensor, the conductive positive electrode is not pressed downwards on application of a force, and the conductive positive electrode cannot contact the corresponding conductive negative electrode. This means that an electrical path is not formed, and the pressure sensor is unable to respond accurately.

The pressure sensor of the claimed invention, in contrast, comprises two sensing modules 203 and 204, such that the first positive electrode 206 of the first sensing module 203, the second support structures 214 of the second sensing module 204, and the first support structures 208 of first sensing module 203 is opposite to the second positive electrode 212 of second sensing module 204.

Figure 4:
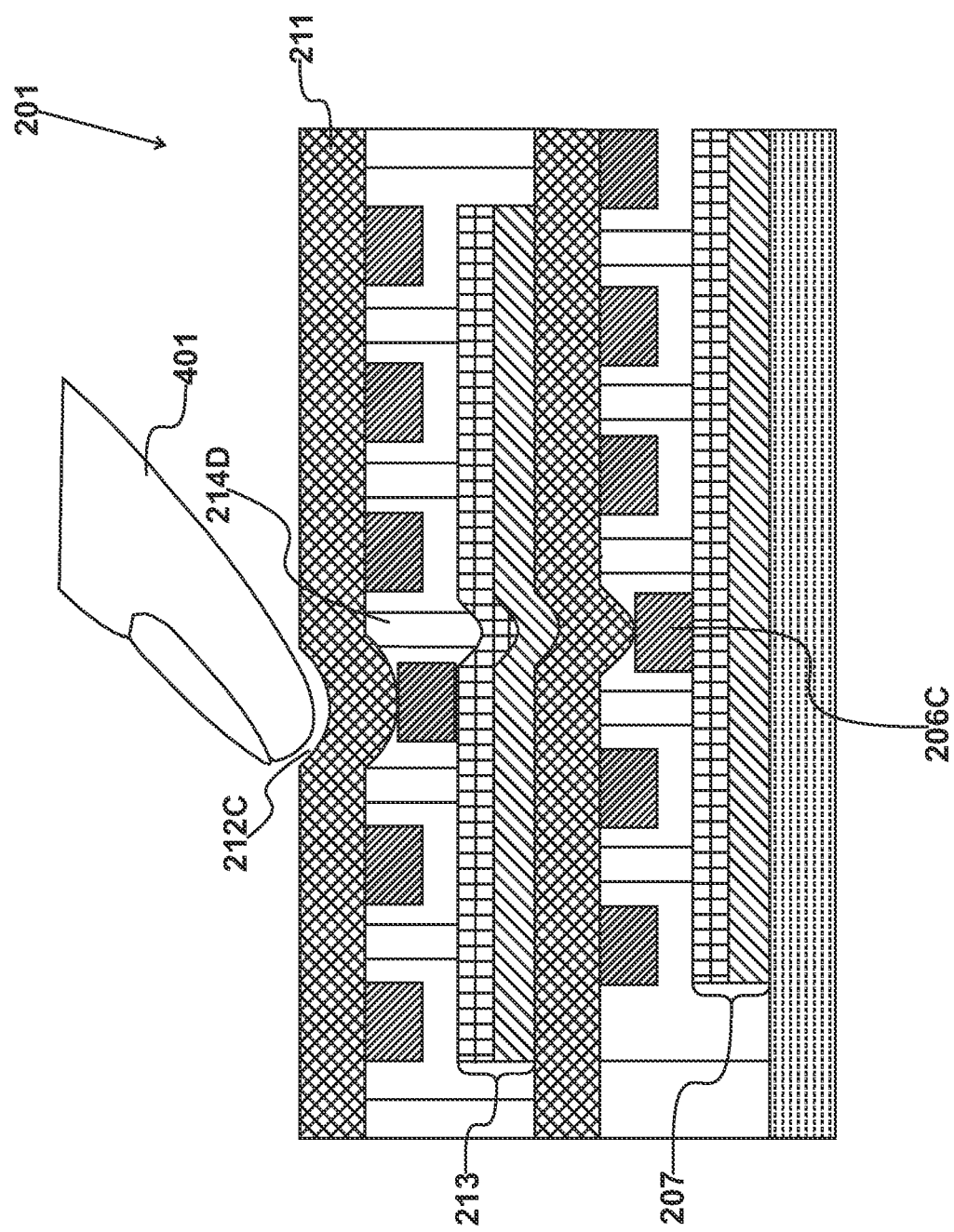
FIG. 4 shows a pressure sensor in accordance with the invention upon application of an applied force.

This arrangement is shown in FIG. 4, which shows the response of pressure sensor 201 on application of an applied force by means of a user's finger 401. In the embodiment, user 101's finger applies a force to second flexible insulating layer 211 of pressure sensor 201. When the applied pressure contacts the area corresponding to second positive electrode 212 on second flexible insulating layer 212, the external pressure causes second positive electrode 212C to be compressed, such that second positive electrode 212C and second negative electrode 213 are brought into contact. When second positive electrode 212C and second negative electrode 213 make contact, pressure sensor 201 outputs a signal of electrical resistance. As the electrical contact resistance changes, the electrical output signal reflects the applied force on the sensing area.

On transmission of the applied force to second flexible insulating layer 211 corresponding to second support structure 214, the applied external pressure causes second support structure 214D to be pressed down. Since second support structure 214 transmits at least part of the applied force, first positive electrode 206C located under second support structure 214D is subjected to the pressure transmitted by second support structure 214D. In this way, first positive electrode 206C and first negative electrode 207 can be brought into contact. When first negative electrode 207 is activated, the pressure sensor 201 outputs a resistance signal. Again, as the electrical contact resistance output changes, the output electrical signal reflects the force applied to the sensing area.

In the pressure sensor of the present invention, the two-layer sensing modules mean that the plurality of first support structures 208 of first sensing module 203 are staggered or offset with the plurality of second support structures 214 of second sensing module 204 such that a user applies a force to one or more of the second support structures 214. As the second support structures 214 are arranged under second flexible insulating layer 212, the second support structures 214 transfer at least part of the force to a first positive electrode 206 located in the first sensing module 203 after the second support structure 214 is stressed. When the second negative electrode 213 contacts and then conducts, this solves the problem with existing pressure sensors of the support structures being non-sensing areas in large scale pressure sensors. This also ensures that the full range of the pressure sensor is utilized, even when a user cannot readily identify the blind areas when utilizing the pressure sensor.

The invention claimed is:

1. A pressure sensor, comprising:
   a first sensing module, and a second sensing module located on said first sensing module;
   said first sensing module comprising,
      a first negative electrode;
      a plurality of first support structures arranged at intervals on said first negative electrode;
      a first flexible insulating layer arranged to cover an upper surface of each said plurality of first support structures; and
      a plurality of first positive electrodes, each said first positive electrode being arranged at intervals on a lower surface of said first flexible insulating layer and distributed between said plurality of first support structures; and
   said second sensing module comprising,
      a second negative electrode disposed on said first flexible insulating layer;
      a plurality of second support structures arranged at intervals on said second negative electrode;
      a second flexible insulating layer arranged to cover an upper surface of each said plurality of second support structures;
      a plurality of second positive electrodes arranged on a lower surface of said second flexible insulating layer at intervals and distributed between said plurality of second support structures; wherein
   said plurality of first support structures are offset from said plurality of second support structures; and
   said plurality of first support structures are located directly opposite to said plurality of second positive electrodes.

2. The pressure sensor of claim 1, further comprising a substrate, wherein said first sensing module is located on said substrate.

3. The pressure sensor of claim 2, wherein said first negative electrode is disposed on said substrate.

4. The pressure sensor of claim 2, wherein said first negative electrode comprises a first negative electrode metallic layer and a first elastic conductive layer.

5. The pressure sensor of claim 4, wherein said first negative electrode metallic layer is disposed on said substrate; and
   said first elastic conductive layer is disposed on said first negative electrode metallic layer; and
   said plurality of first support structures are arranged on said first elastic conductive layer at intervals.

6. The pressure sensor of claim 2, wherein said first negative electrode is disposed on said substrate by a printing process.

7. The pressure sensor of claim 1, wherein said second negative electrode comprises a second negative electrode metallic layer and a second elastic conductive layer.

8. The pressure sensor of claim 7, wherein said second negative electrode metallic layer is disposed on said first flexible insulating layer on an upper surface; and
   said second elastic conductive layer is disposed on said second negative electrode metallic layer; and
   said plurality of second support structures are arranged on said second elastic conductive layer at intervals.

9. The pressure sensor of claim 1, said first negative electrode comprising a first elastic conductive layer and said second negative electrode comprising a second elastic conductive layer; wherein when either one of said first elastic conductive layer or said second elastic conductive layer receives an applied force, said first elastic conductive layer or said second elastic conductive layer increases in contact area.

10. The pressure sensor of claim 1, wherein each of said plurality of first support structures and each of said plurality of second support structures comprises a colloid material.

11. The pressure sensor of claim 1, wherein said plurality of second support structures are located directly opposite to said plurality of first positive electrodes.

12. The pressure sensor of claim 1, wherein each said first positive electrode is arranged in a gap between two of said plurality of first support structures; and
   each said second positive electrode is arranged in a gap between two of said plurality of second support structures.

13. The pressure sensor of claim 12, wherein a width of each said first positive electrode is smaller than a width of said gap between two of said plurality of first support structures; and
   a width of said second positive electrode is smaller than a width of said gap between two of said plurality of second support structures.

14. The pressure sensor of claim 1, wherein each of said plurality of second positive electrodes is disposed underneath said second flexible insulating layer by a printing process.

15. A touch screen comprising the pressure sensor of claim 1.

16. A pressure sensor, comprising:
   a first sensing module, and a second sensing module located on said first sensing module;
   said first sensing module comprising, a first negative electrode;
   a plurality of first support structures arranged at intervals on said first negative electrode;
   a first flexible insulating layer arranged to cover an upper surface of each said plurality of first support structures; and
   a plurality of first positive electrodes, each said first positive electrode being arranged at intervals on a lower surface of said first flexible insulating layer and distributed between said plurality of first support structures; and said second sensing module comprising, a second negative electrode disposed on said first flexible insulating layer;

a plurality of second support structures arranged at intervals on said second negative electrode;

a second flexible insulating layer arranged to cover an upper surface of each said plurality of second support structures;

a plurality of second positive electrodes arranged on a lower surface of said second flexible insulating layer at intervals and distributed between said plurality of second support structures;

wherein said plurality of first support structures are offset from said plurality of second support structures; and said plurality of second support structures are located directly opposite to said plurality of first positive electrodes.

* * * * *